US012806671B1

(12) United States Patent
Izedian

(10) Patent No.: US 12,806,671 B1
(45) Date of Patent: Nov. 24, 2026

(54) PLASMA WASTE TREATMENT PLANT

(71) Applicant: Ramesh Izedian, Fall River, MA (US)

(72) Inventor: Ramesh Izedian, Fall River, MA (US)

( * ) Notice: Subject to any disclaimer, the term of this patent is extended or adjusted under 35 U.S.C. 154(b) by 607 days.

(21) Appl. No.: 18/236,118

(22) Filed: Aug. 21, 2023

(51) Int. Cl.
*B09B 3/45* (2022.01)
*B09B 3/70* (2022.01)
*C10K 1/10* (2006.01)

(52) U.S. Cl.
CPC .................. *B09B 3/45* (2022.01); *B09B 3/70* (2022.01); *C10K 1/101* (2013.01)

(58) Field of Classification Search
CPC .............. B09B 3/45; B09B 3/70; C10K 1/101
See application file for complete search history.

(56) References Cited

U.S. PATENT DOCUMENTS

| | | | | |
|---|---|---|---|---|
| D192,548 | S | 4/1962 | Sherman | |
| 3,728,976 | A | 4/1973 | Domnitch | |
| 4,635,569 | A | 1/1987 | Domnitch | |
| 8,870,735 | B2 | 10/2014 | Villamagna | |
| 10,060,296 | B2 | 8/2018 | Friesth | |
| 10,188,119 | B2 | 1/2019 | Foret | |
| 2006/0144305 | A1* | 7/2006 | Vera | F23J 15/04 110/341 |
| 2014/0024528 | A1 | 1/2014 | Smith | |
| 2017/0001886 | A1 | 1/2017 | Foret | |

FOREIGN PATENT DOCUMENTS

| | | | |
|---|---|---|---|
| RU | 2725411 C2 * | 7/2020 | F23G 7/00 |

OTHER PUBLICATIONS

English translation of RU-2725411-C2 (Year: 2018).*

* cited by examiner

*Primary Examiner* — Sean E Conley
(74) *Attorney, Agent, or Firm* — Cramer Patent & Design, PLLC.; Aaron R. Cramer

(57) ABSTRACT

A plasma waste treatment plant is arc plasma incinerator for municipal organic waste streams. The plant is capable of processing both liquid and solid organic waste, converting complex polymers into gaseous carbons and carbon monoxide to prevent the release of highly hazardous compounds into the environment, as is the case with current incineration systems. In addition, the current facility is compact and highly mobile, allowing for its relocation as required. The plant employs the following subsystems for incineration: a reactor, an oxygen system, an electric driver system, a heat exchanger, a cold-water pipe system, a hot water pipe system, a steam generator, a syngas cleaning system, an oxygen pipe system, a steam pipe system, a syngas pipe system, and an associated control system. The plant's primary byproduct is syn-gas, which can be sold to generate revenue. The syn-gas is used as a raw material to produce methanol and higher alcohols, ammonia, nitrogen fertilizers, synthetic motor lubricant, fuel, and other related compounds. The characteristics of the facility guarantee that no liquid, solid, or gaseous emissions are released into the atmosphere. The Incinerator Appliance allows for the destruction of a wide variety of municipal refuse streams without any of the drawbacks associated with current disposal methods.

17 Claims, 11 Drawing Sheets

PLASMA WASTE TREATMENT PLANT

RELATED APPLICATIONS

None.

FIELD OF THE DEVICE

The present device relates generally to a waste treatment plant utilizing plasma and more specifically to a waste treatment plant utilizing plasma that is relatively portable.

BACKGROUND OF THE DEVICE

In light of society's growing recognition of the depletion of natural resources and the accumulation of garbage in landfills, the urgency for efficient waste management has escalated significantly. Numerous municipalities have made notable progress by implementing and, in certain instances, enforcing recycling services for their inhabitants. The aforementioned endeavors have already demonstrated certain advantages; however, the whole extent of recycling's potential remains to be fully actualized in forthcoming times. Nevertheless, although the ongoing efforts in recycling, a substantial quantity of municipal waste still necessitates proper management. Historically, landfills have been the predominant approach for waste disposal; nevertheless, they include a multitude of drawbacks that have adverse implications for both the ecosystem and future generations. Landfills are frequently related with the occurrence of soil, groundwater, and air pollution, which in turn result in enduring environmental harm. Furthermore, landfills encompass extensive areas of viable land that may be more effectively utilized for purposes such as residential development, agricultural activities, or fulfilling other communal requirements.

The use of burning or incineration has been suggested as a potential alternate strategy for waste management, as it has the capacity to substantially diminish trash volume while concurrently generating energy. Nevertheless, incineration is not without of its disadvantages. Despite its potential to alleviate certain landfill problems, this practice nonetheless adds to the exacerbation of air pollution by releasing detrimental pollutants into the environment. Moreover, the operational expenses associated with incineration facilities might be substantial, hence diminishing their feasibility for extensive adoption.

This leads us to the necessity of a novel solution that can efficiently tackle the difficulties presented by traditional waste management techniques. The emergence of the plasma waste treatment facility presents a potentially viable substitute for conventional burning methodologies. The process of plasma waste treatment involves the utilization of an ionized gas subjected to exceedingly high temperatures, with the objective of transforming organic municipal garbage into synthetic gas and inert solid wastes.

There are several important advantages associated with plasma waste treatment:

1. The use of plasma waste treatment has been found to be more effective in reducing air pollution when compared to conventional incineration methods. This is mostly due to the ability of the high temperatures within the plasma chamber to efficiently decompose dangerous organic molecules, hence decreasing the release of poisonous substances into the atmosphere.
2. Energy production: Plasma waste treatment, like incineration, involves the generation of energy through the conversion of waste. The available energy can be effectively captured and utilized to supply power to the treatment facility or even be integrated into the existing electrical grid, hence mitigating operational expenses. The process of plasma waste treatment results in a substantial reduction in waste volume, hence offering a space-efficient and environmentally sustainable solution.
3. The management of hazardous waste: Plasma treatment has been found to be a highly successful method for the handling of hazardous waste streams, effectively mitigating the potential discharge of these wastes into the environment and so lowering associated dangers to public health.
4. Land reclamation: Plasma waste treatment serves to diminish waste volume and eradicate detrimental byproducts, so mitigating the necessity for expansive landfills. Consequently, this practice safeguards precious real estate for the benefit of forthcoming generations.
5. Resource recovery refers to a method that holds the potential to retrieve valuable elements from the waste stream, specifically metals, which can then be reused or repurposed.
6. Plasma waste treatment exhibits a high degree of versatility by effectively managing a diverse array of waste materials, including organic municipal garbage, medical waste, and industrial waste. This adaptability renders it a flexible and multifaceted solution for waste management.

In summary, the increasing awareness of environmental issues and the difficulties associated with traditional waste management approaches have generated a pressing demand for inventive resolutions. The plasma waste treatment facility presents a compelling and compact option that has the potential to substantially mitigate pollution, produce electricity, restore land, and efficiently handle municipal garbage. Communities can achieve substantial progress in sustainable waste management and contribute to environmental preservation for future generations by adopting advanced technologies.

SUMMARY OF THE DEVICE

The plasma waste treatment plant consists of various components, including a reactor for thermal decomposition of waste with incomplete oxidation, a plasmatron for generating plasma, oxygen and steam supply systems, a coolant delivery line, a syn-gas cleaning system, and a compact housing. The syn-gas produced after purification can be used for various purposes, such as raw material for production of chemicals and fuels or for autonomous power supply. The plant is designed to be portable. The plant's steam-plasma processing process is not affected by the humidity of the waste and retains its effectiveness regardless of changes in the moisture content of the solid waste. During the operation of the plant, no liquid, solid, or gaseous emissions are released into the environment. The plant operates silently and does not emit any odors.

The plant does not require the addition of chemicals during operation, and it can completely sterilize biologically contaminated waste using high temperatures and ultraviolet radiation produced within the plant. The plant is versatile and capable of disposing of both solid and wet waste. The reactor has a generally six-sided rectangular prismatic shape with rounded corners and insulation on its inner surface. It is preferably made of metal. The reactor has a capacity of five to ten kilowatts (5-10 kW) and includes at least three plasmatrons arranged along a common bisecting annular line on its surface.

The agitator, which mixes waste inside the reactor, is indirectly driven by a prime mover of the drive motor system and includes a helical screw portion. Each plasmatron is removably attached to the reactor body with a complex geometry bushing to generate plasma by mixing inert gases, oxygen, and steam. The plasmatron mount is a bushing of complex geometry designed to attach a plasmatron to the reactor body. Each plasmatron has a main chamber where plasma is generated, and a plasma-forming medium is created by a mixture of inert gases, oxygen, and steam. The plant includes a steam generator that produces steam from the coolant and is connected to a steam delivery line. The plant has a heat exchanger downstream from the reactor that cools the coolant and is connected to the coolant delivery line. The oxygen system consists of a bundle of standard oxygen cylinders connected to the oxygen delivery line to supply oxygen to the plasmatron. The plant includes a syn-gas cleaning system with components like a syn-gas cleaner housing, syn-gas purification tank, and syn-gas tank for storing purified syn-gas. The syn-gas purification tank is filled with water for purifying syn-gas, and purified syn-gas is transferred to the syn-gas tank via a syn-gas transfer.

BRIEF DESCRIPTION OF THE DRAWINGS

The advantages and features of the present disclosure will become better understood with reference to the following more detailed description and claims taken in conjunction with the accompanying drawings, in which like elements are identified with like symbols and like reference numerals represent similar or like parts, and in which:

DESCRIPTIVE KEY

Figure 1:
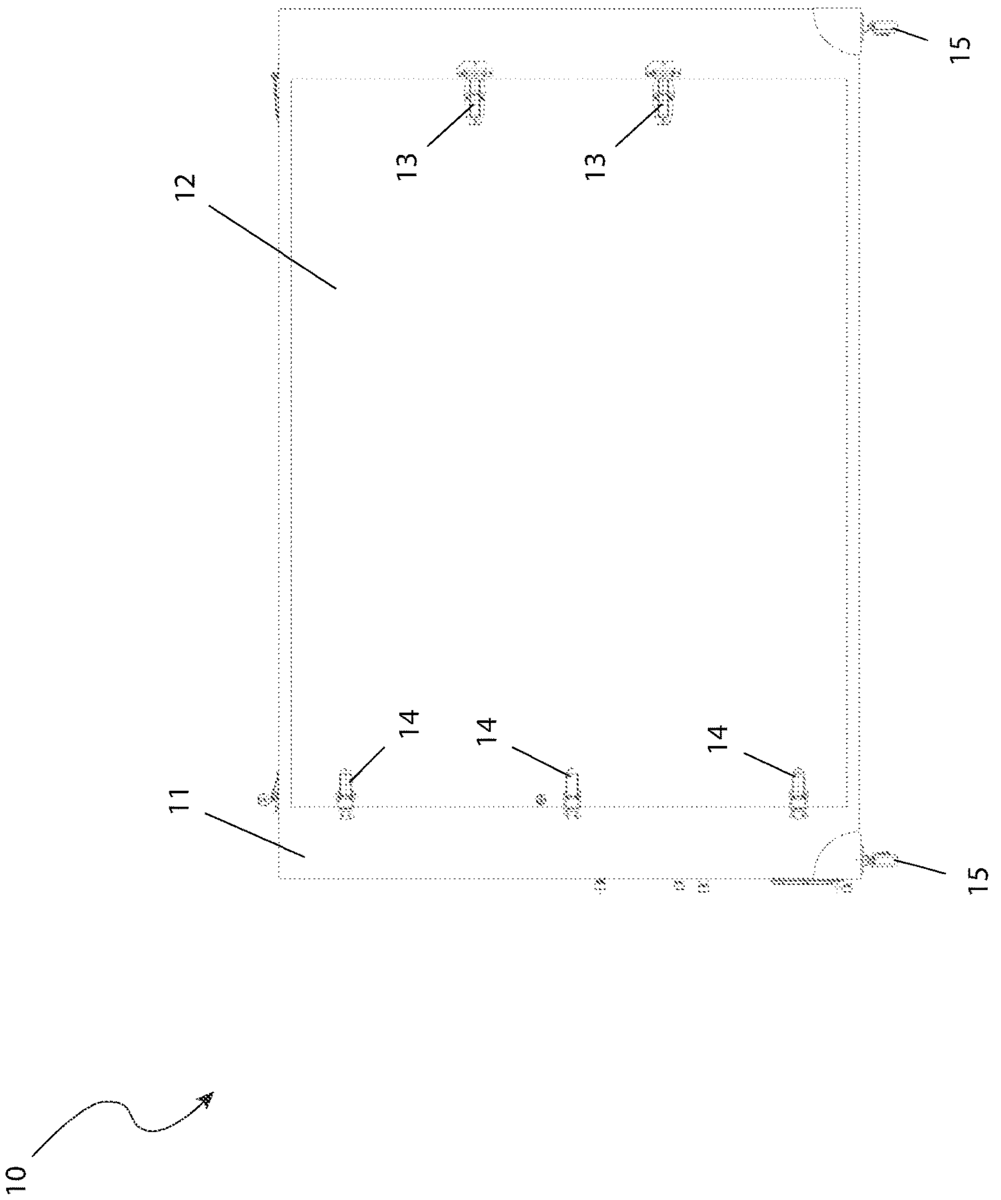
FIG. 1 is a front view of a plasma waste treatment plant 10, according to the preferred embodiment of the present device.

10 plasma waste treatment plant
11 housing
12 front door
13 hinge
14 latch
15 wheel
16 top door
17 housing interior
20 reactor
21 reactor outlet
22*a* first shaft bearing
22*b* second shaft bearing
23*a* reactor body
23*b* insulation
24 reactor lid
25*a* reactor latch
25*b* reactor hinge
26 plasmatron
27 plasmatron mount
28 temperature control device
29 reactor interior
30 oxygen (O2) system
31 cylinder
32 manifold
35 base
36 strap
40 drive motor system
41 shaft
42 clutch
43 driver support
45 prime mover
48 agitator
50 heat exchanger
51 hot side inlet
52 hot side outlet
53 cold side inlet
54 cold side outlet
55 heat exchanger support
60 coolant delivery line
65 filter
66 filter inlet
67 filter outlet

70 return line
80 steam generator
81 steam generator inlet
82 steam generator outlet
90 syn-gas cleaning system
91 syn-gas cleaner housing
92 syn-gas tank
93 drain
94 syn-gas inlet
95 syn-gas transfer
96 syn-gas purification tank
**97*a*** monitor
**97*b*** indicator
**97*c*** switch
**97*d*** gauge
98 purified syn-gas outlet
99 water (H2O) inlet
100 oxygen (O2) delivery line
110 steam delivery line
120 syngas delivery line
130 main chamber
131 jacket
132 coolant inlet
133 steam inlet
134 inlet bushing array
135 nozzle
136 oxygen (O2) inlet
137 adapter
**138*a*** nozzle fastener
**138*b*** adapter fastener
139 inlet bushing array fastener
140 mount first end
141 mount second end
142 mount bore

DETAILED DESCRIPTION OF THE PREFERRED EMBODIMENT

The device generally relates to a plasma waste treatment plant 10 in a relatively portable configuration and is particularly suited to neutralize hazardous substances and industrial waste via a reactor 20. The plasma waste treatment plant (herein described as the "plant" 10) is to create an installation for the disposal of organic waste, the principle of operation which is based on plasma technology. Illustrations of an exemplary embodiment of the plasma waste treatment plant 10 are provided herein within FIGS. 1-**14*b***.

The general principle of plasma waste treatment is thermal decomposition of the waste with incomplete oxidation under the influence of water vapor (H2O), atmospheric oxygen (O2), and pressure. To prevent the waste from burning, it is necessary to control the flow of the oxidizing agent, of which ambient air is used. Pyrolysis starts at temperatures above one thousand Celsius (1000° C.). Such a plant 10 is intended to efficiently treat waste. At the outlet of the reactor 20, a mixture of hydrogen (H2), carbon monoxide (CO), and other combustible gases is formed. The product obtained at the outlet of the reactor 20 is defined as "syn-gas". The syn-gas may be utilized as a raw material for the production of methanol (CH3OH) and higher alcohols, ammonia (NH4), nitrogenated fertilizers, synthetic motor oil, and fuel. The syn-gas can be also used for autonomous power supply of a small room or for powering a portion or an entirety of the entire plasma waste treatment plant 10 operations.

The plasma waste treatment plant 10 is universal and permits disposal of both solid and wet waste. The process of steam-plasma processing is insensitive to the humidity of the processed waste and does not lose its destructive ability when the moisture content of the solid changes. No liquid, solid or gaseous emissions from the plasma waste treatment plant 10 are released into the environment. The plasma waste treatment plant 10 operates silently and does not emit odors. No chemicals are added during the operation of the plasma waste treatment plant 10; any processing of biologically contaminated waste is completely sterilized under the influence of high temperatures greater than thirty-five hundred degrees Celsius (>3500° C.) and high levels of ultraviolet radiation produce within the plasma waste treatment plant 10.

The plasma waste treatment plant 10 further has at least one (1) plasmatron 26 located on the reactor 20, an oxygen (O2) system 30, a steam generator 80, a drive motor system 40, a heat exchanger 50, and a syn-gas cleaning system 90, all interacting with each other in a compact housing 11. The syn-gas produced within the reactor 20 is directed to the syn-gas cleaning system 90 via a syn-gas delivery line 120. Further downstream usage of the cleaned syn-gas can be stored or delivered via the plasma waste treatment plant 10. A coolant delivery line 60 supplies cool water to the plasma waste treatment plant 10 and a return line 70 provides for the removal of warm (or hot) water (H2O) from the plasma waste treatment plant 10. An oxygen (O2) delivery line 100 conveys oxygen (O2) from the oxygen (O2) system 30 to each plasmatron 26 of the reactor 20. Steam generated in the steam generator 80 is delivered to the plasma waste treatment plant 10 as necessary via the steam delivery line 110.

Figure 2:
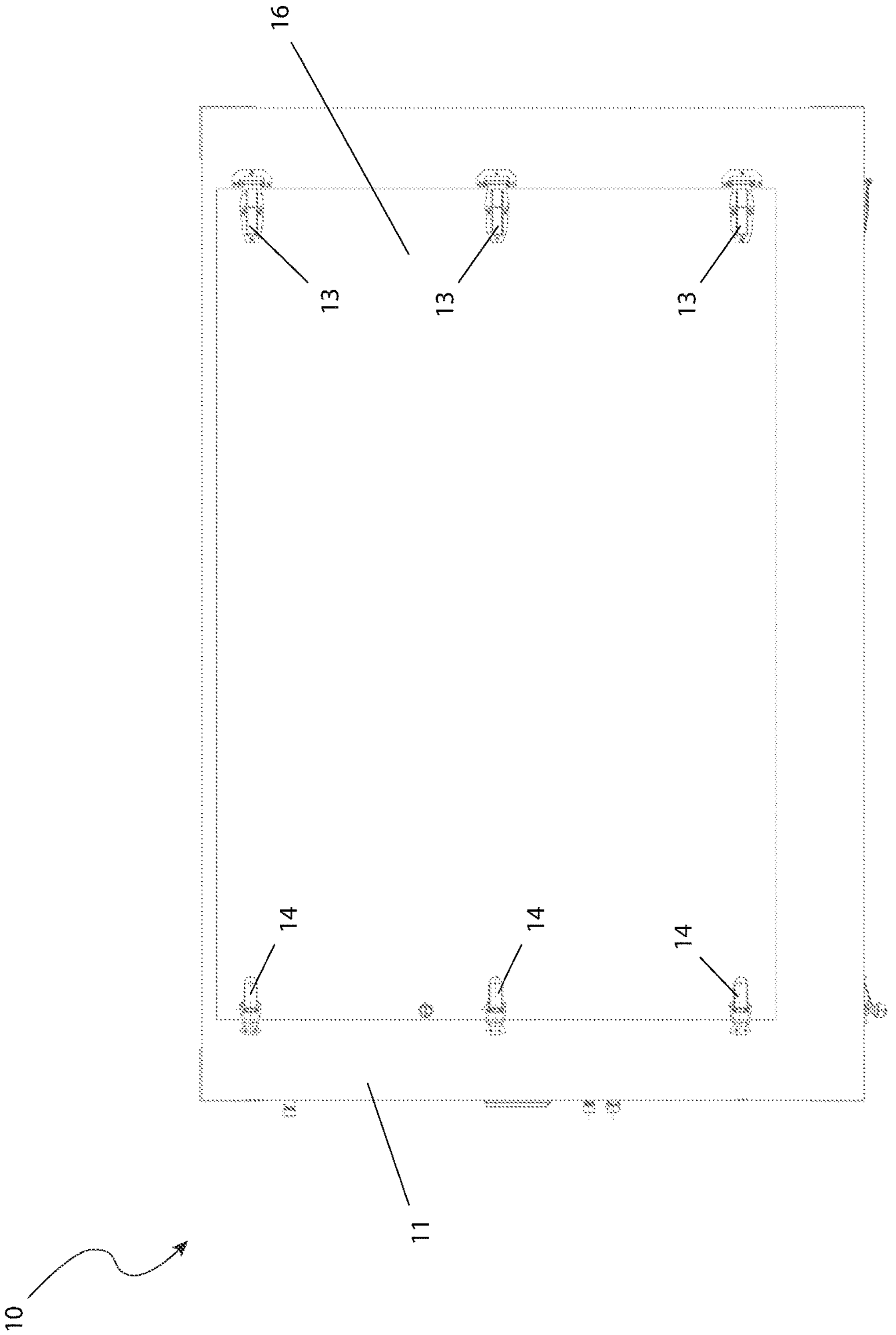
FIG. 2 is a top view of the plasma waste treatment plant 10, according to the preferred embodiment of the present device.
Figure 3A:
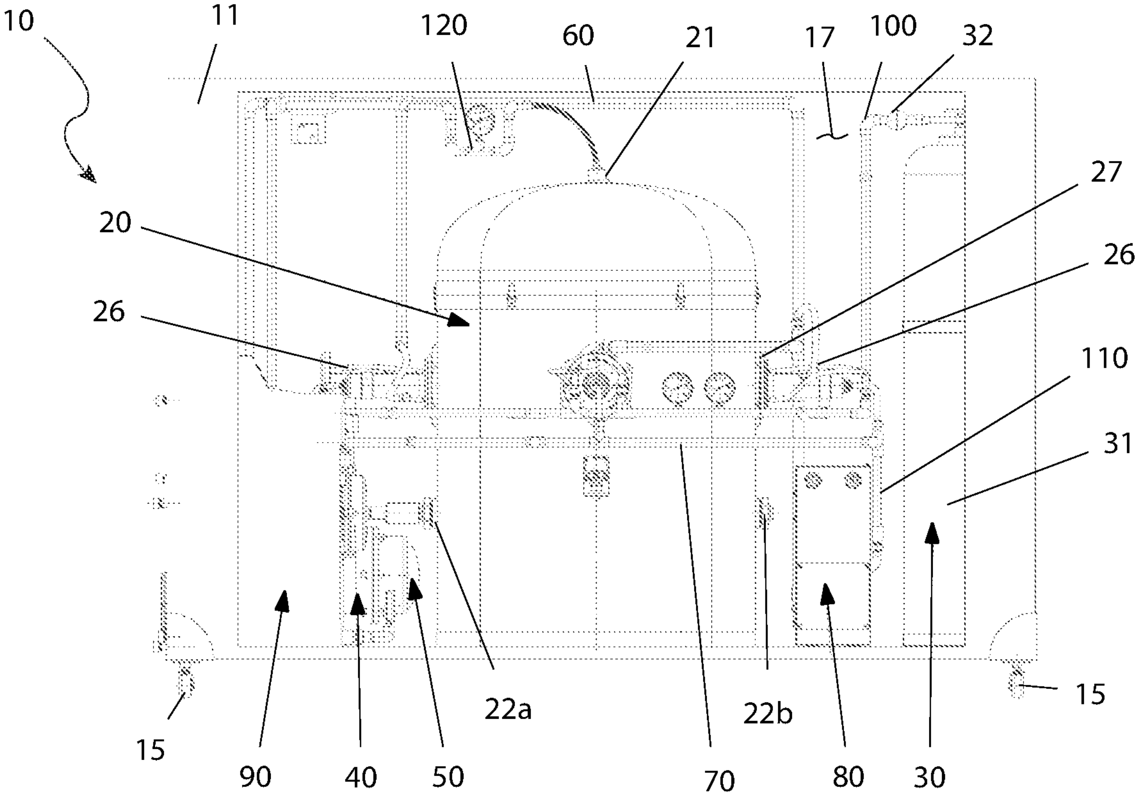
FIG. 3*a* is a front view of the plasma waste treatment plant 10, with the front door 12 of the housing 11 open to see the housing interior 17, according to the preferred embodiment of the present device.
Figure 3B:
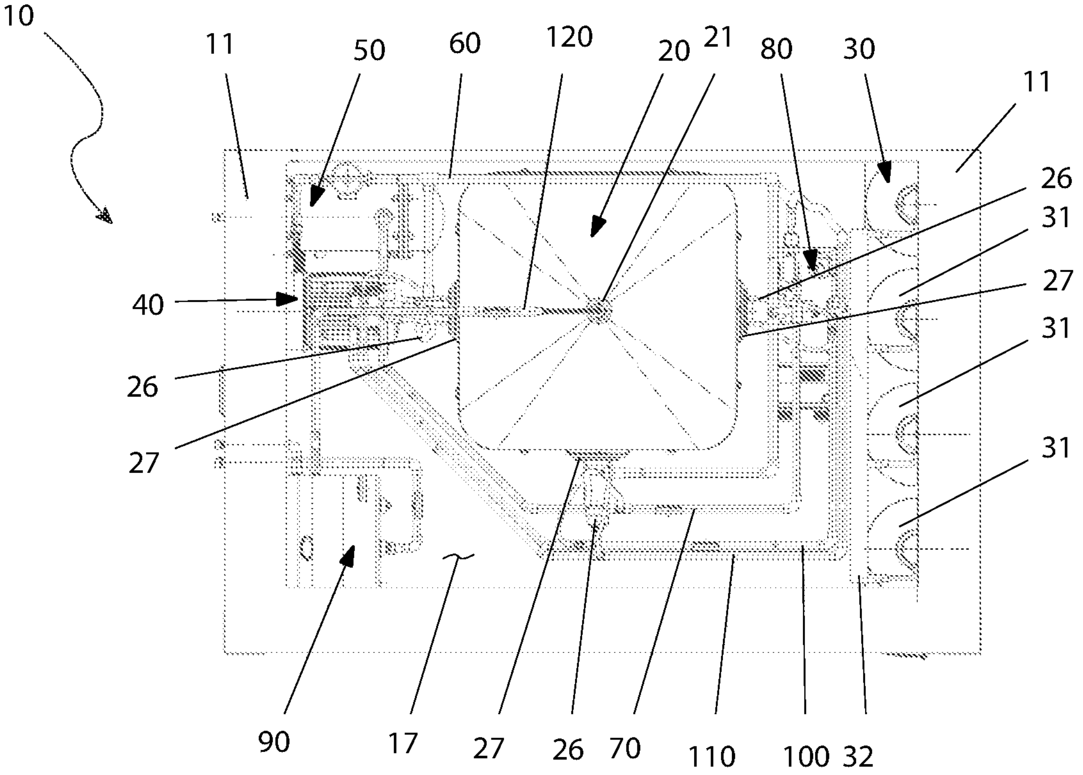
FIG. 3*b* is a top view of the plasma waste treatment plant 10, with the top door 16 of the housing 11 open to see the housing interior 17, according to the preferred embodiment of the present device.

Referring now to FIG. 1, a front view of the plasma waste treatment plant 10 and a FIG. 2, a top view of the plasma waste treatment plant 10, each illustrate the housing 11, having a housing interior 17 of which all systems of the plasma waste treatment plant 10 reside. The housing 11 includes a six-sided structure having a front door 12 hingedly attached to a front wall with at least one (1) hinge 13 and secured to the front wall with at least one (1) latch 14. The housing 11 also includes a six-bottom wall, a pair of side walls, and a top wall having a top door 16 hingedly attached to the top wall with at least one (1) hinge 13 and secured to the top wall with at least one (1) latch 14. Wheels 15 are attached to the outer surface of the bottom of the housing 11 to provide weight bearing and ease of transportation of the plasma waste treatment plant 10. The wheels 15 may be capable of being locked in position. The front door 12 and top door 16 each provide access to the housing interior 17. The housing 11 may be constructed out of a tubular metal frame sheathed with plastic. In at least one (1) embodiment, an overall size of the plasma waste treatment plant 10 is one thousand twenty six by one thousand seventy-five millimeters (1526×1075 mm).

Referring now to FIGS. **3*a* and 3*b*, front and top views of the plasma waste treatment plant 10 is illustrated herein, where the front door 12 and top door 16 is open and the housing interior 17 is visible. The reactor 20 is located in the center of housing interior 17 and secured thereto. The oxygen (O2) system 30 is located on a first side of the reactor 20 and is capable of being removed from the housing 11. The steam generator 80 is located on a first side of the reactor 20 and is adjacent the oxygen (O2) system 30 On the opposing second side of the reactor 20 is the drive motor system 40, the heat exchanger 50, and the syn-gas cleaning system 90 are located. The coolant delivery line 60, return line 70, oxygen (O2) delivery line 100, and the steam delivery line 110 and their branches, valves, pipe fittings, monitoring and safety equipment, and support structures are contained within the housing interior 17. Also contained within the housing interior 17 is the syn-gas delivery line 120 that conveys the syn-gas produced in the reactor 20 to enter the syn-gas cleaning system 90. The abovementioned features and assemblies may secured to the housing 11**, either on a floor or minimally suspended thereabove.

Figure 4A:
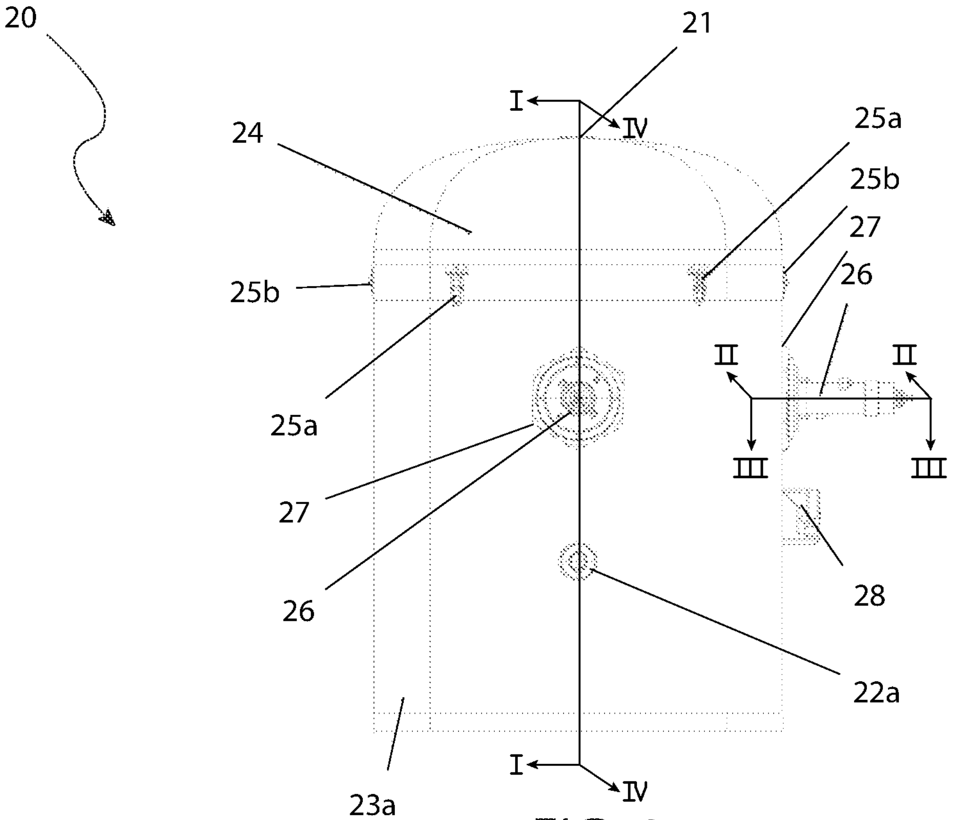
FIG. 4*a* is a front view of a reactor 20, according to the preferred embodiment of the present device.
Figure 4B:
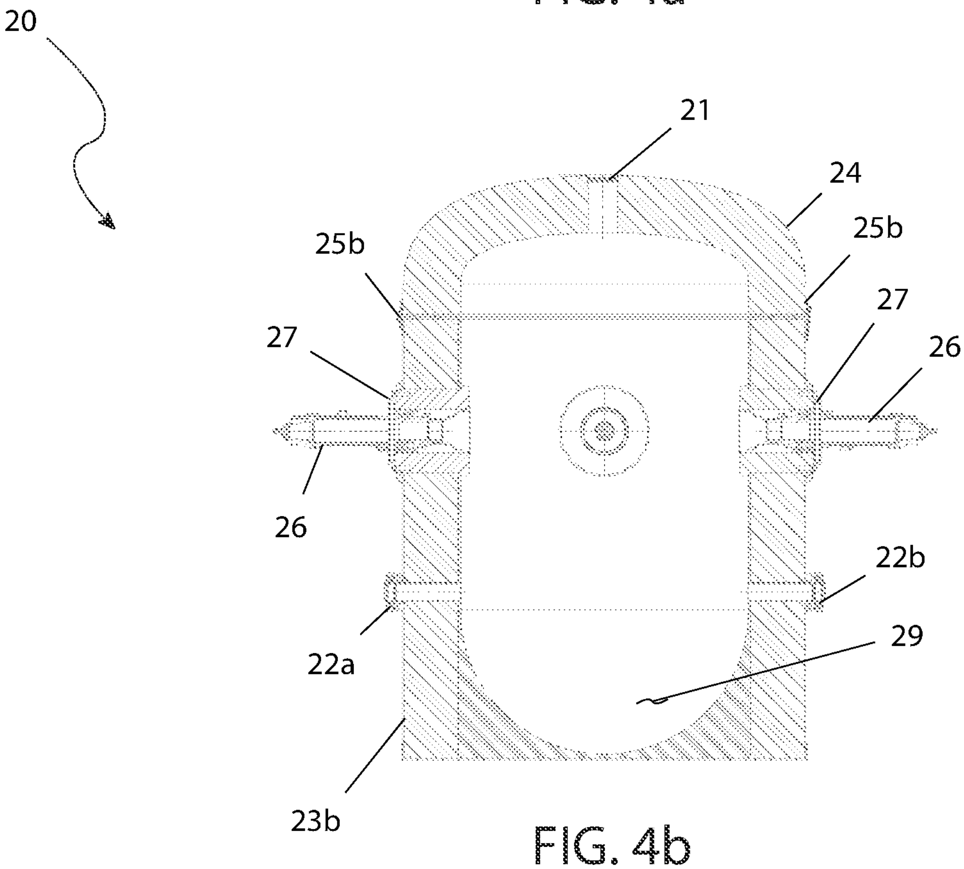
FIG. 4*b* is a cross-sectional view of the reactor 20 along the line I-I (see FIG. 4*a*), according to the preferred embodiment of the present device.

Referring now to FIG. 4*a*, a front view of the reactor 20, and FIG. 4*b*, a cross-sectional view of the reactor 20 is illustrated herein. The reactor 20 has a generally six-sided rectangular prismatic reactor body 23*a* with rounded corners, a reactor interior 29, insulation 23*b* on an inner surface thereof, and is preferably manufactured out of metal. The insulation 23*b* may be refractory ceramics. The reactor body 23*a* further has a plurality of plasmatrons 26 removably attached thereto, each having a portion residing within the reactor interior 29, and each affixed to the reactor body 23*a* with a plasmatron mount 27. A reactor lid 24 attached to a top of the reactor body 23*a* with at least one (1) reactor hinge 25*b* and secured to the reactor body 23*a* with a reactor latch 25*a*. The reactor lid 24 provides access to the reactor interior 29. A reactor outlet 21 is in fluid communication between the reactor interior 29 and the syn-gas delivery line 120. A temperature control device 28 is located on an exterior surface of the reactor body 23*a* for monitoring and transmitting data relative to temperature within the reactor interior 29.

The reactor 20 preferably comprises a capacity of five to ten kilowatts (5-10 kW). The reactor 20 accepts waste therein for providing a closed chamber process for producing combustible gas. Plasma processing of waste begins with the loading of dried and crushed waste into the reactor interior 29 through the reactor lid 24. Each plasmatron 26 is preferably arranged along a common bisecting annular line on the surface of the reactor body 23*a* with other plasmatrons 26 in an annular arrangement. In the exemplary embodiment, there are three (3) plasmatrons 26.

Figure 7:
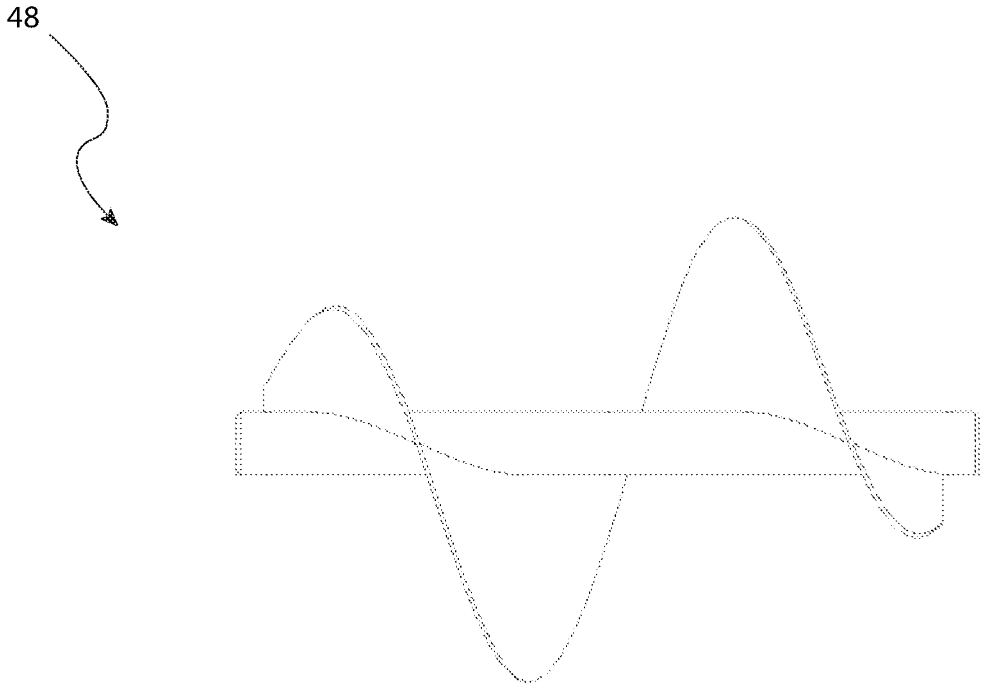
FIG. 7 is a perspective view of an agitator 48, according to the preferred embodiment of the present device.
Figure 8:
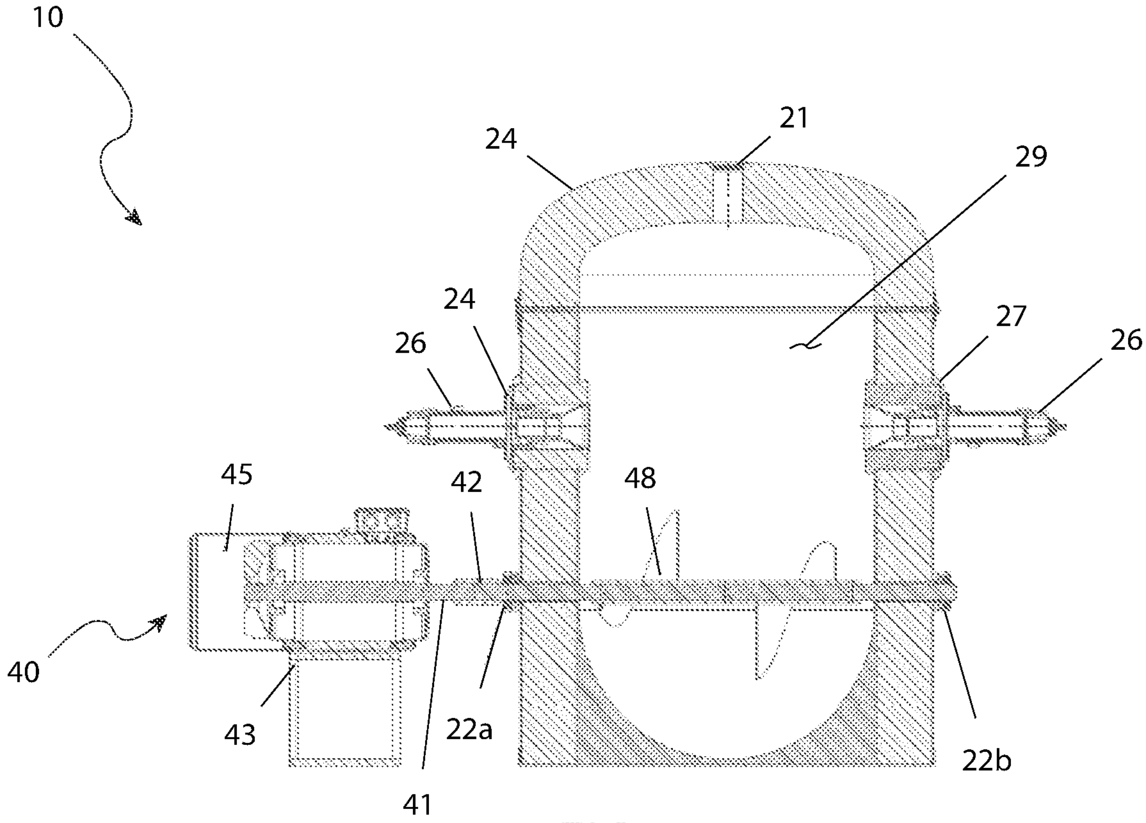
FIG. 8 is a cross-sectional view of the reactor 20 along the line IV-IV (see FIG. 4*a*), a cross-section of a drive motor system 40, and a driver support 43, according to the preferred embodiment of the present device.
Figure 9:
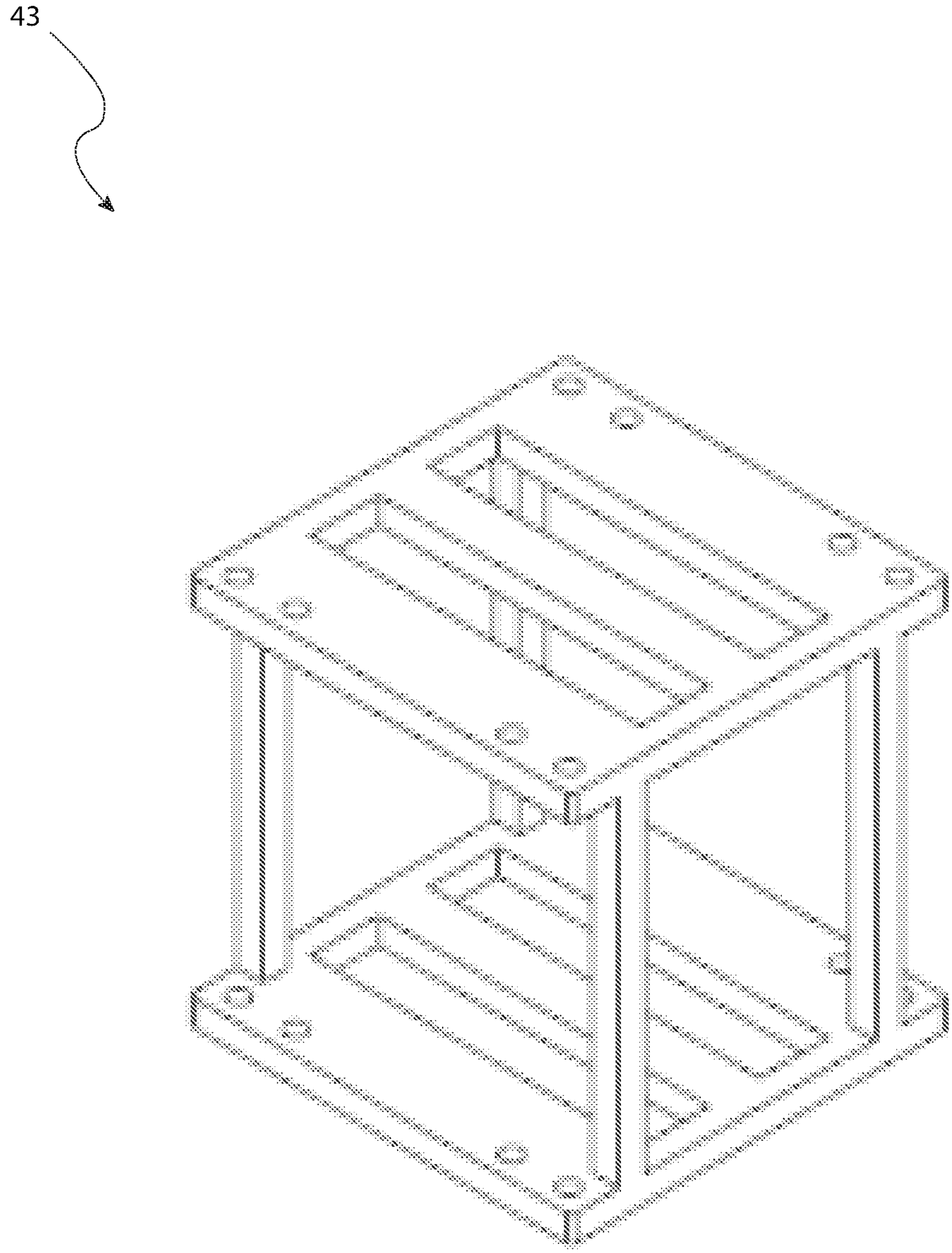
FIG. 9 is a perspective view of the driver support 43, according to the preferred embodiment of the present device.

Referring more closely to FIGS. 7 and 8, an agitator 48 is located within the reactor interior 29 and comprises a helical screw portion capable of agitating, churning, mixing, etc. any waste in order to increase waste disposal efficiency. The agitator 48 is indirectly driven by a prime mover 45 of the drive motor system 40. The agitator 48 includes a first end attached to a clutch 42 and is driven thereby, a generally linear body passing through and rotatably attached to a first shaft bearing 22*a* passing through the reactor body 23*a* with the helical screw fully residing within the reactor interior 29, and a second end rotatably attached to a second shaft bearing 22*b* mounted to an interior of the reactor 20. Either or both of the shaft bearings 22*a*, 22*b* may have vacuum supports to minimize or eliminate any vibration effects during usage. To transmit torque from the prime mover 45 to the clutch 42, an additional shaft 41 is mechanically coupled thereto. The prime mover 45 is mounted and aligned to the agitator 48 and reactor 20 with a driver support 43 (see FIG. 9). Such a prime mover 45 may be a three-phase electric driver with an electromagnetic brake device. The brake device provides the ability to provide a fixed stop of the prime mover 45 at a regulated time or when the power is turned off. When power is applied to the prime mover 45, it is released.

Figure 5:
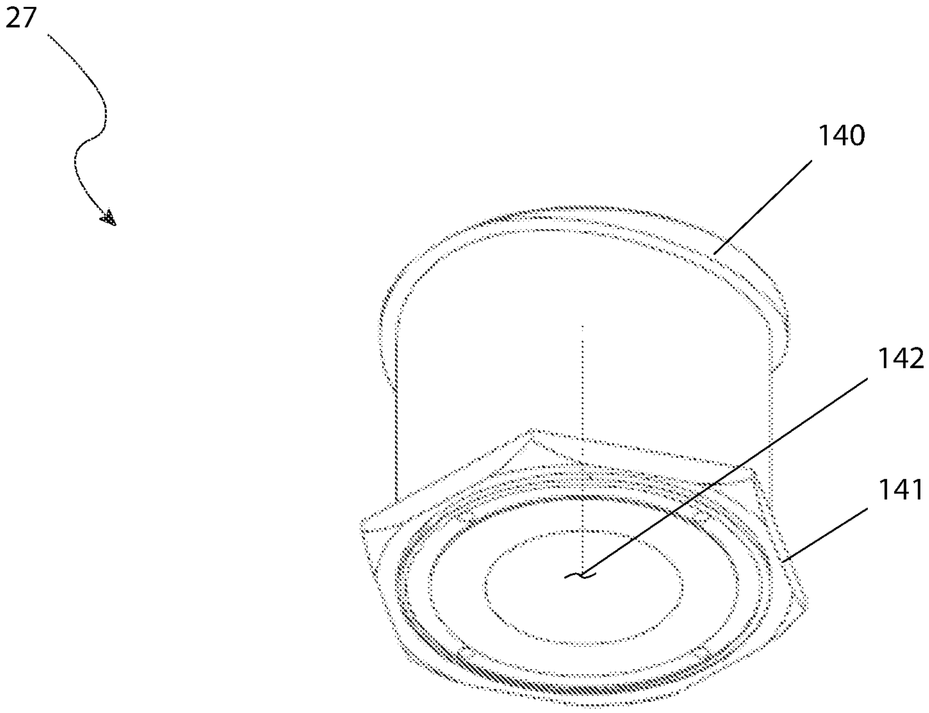
FIG. 5 is a perspective view of a plasmatron mount 27, according to the preferred embodiment of the present device.

Referring now to FIG. 5, there is a perspective view of a plasmatron mount 27, fashioned as a bushing of complex geometry, configured to affix a plasmatron 26 to the reactor body 23*a*. A mount first end 140 extends through the reactor body 23*a* and insulation 23*b* to be in fluid communication with the reactor interior 29. A mount second end 141, opposite said mount first end 140, further comprises a mount bore 142. The plasmatron 26 is mounted to the mount second end 141 such that a portion thereof extends through the plasmatron mount 27 and away from the mount first end 140 to be in environmental communication with the reactor interior 29.

Figure 6A:
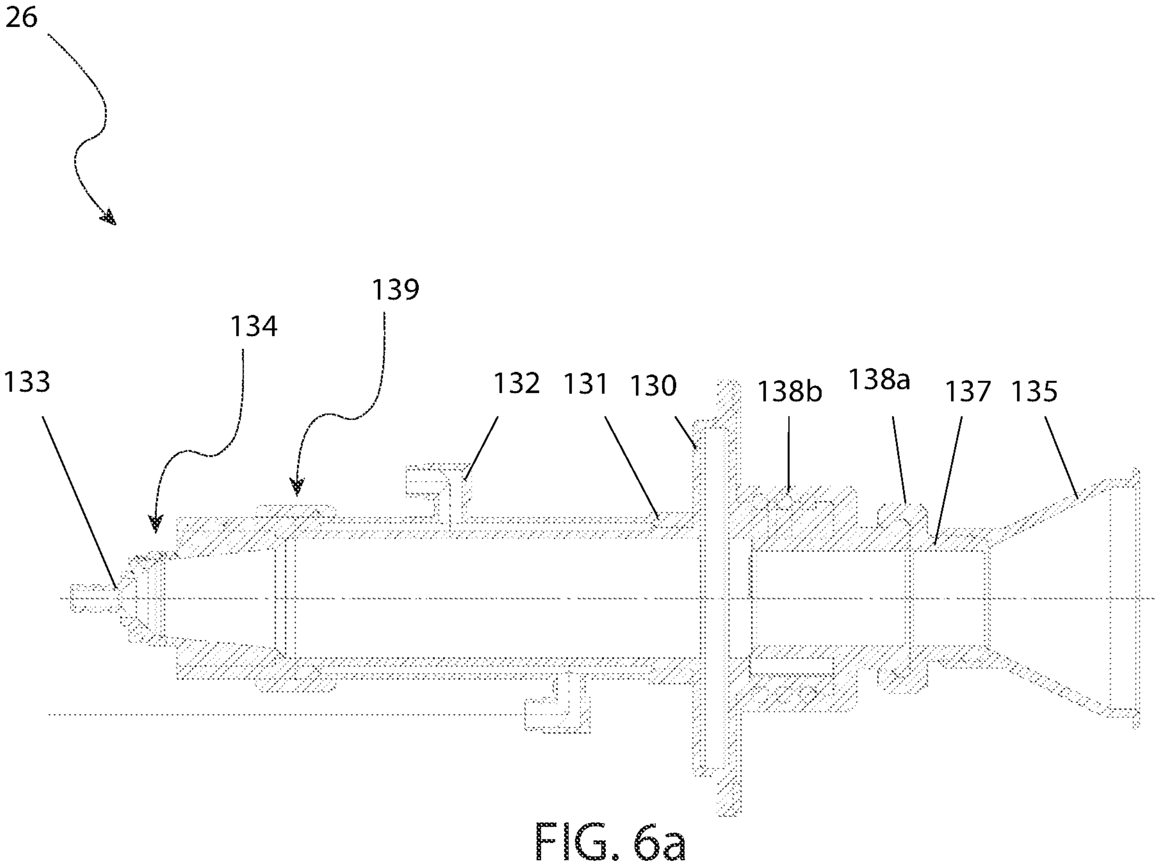
FIG. 6*a* is a cross-sectional view of a plasmatron 26 along the line II-II (see FIG. 4*a*), according to the preferred embodiment of the present device.
Figure 6B:
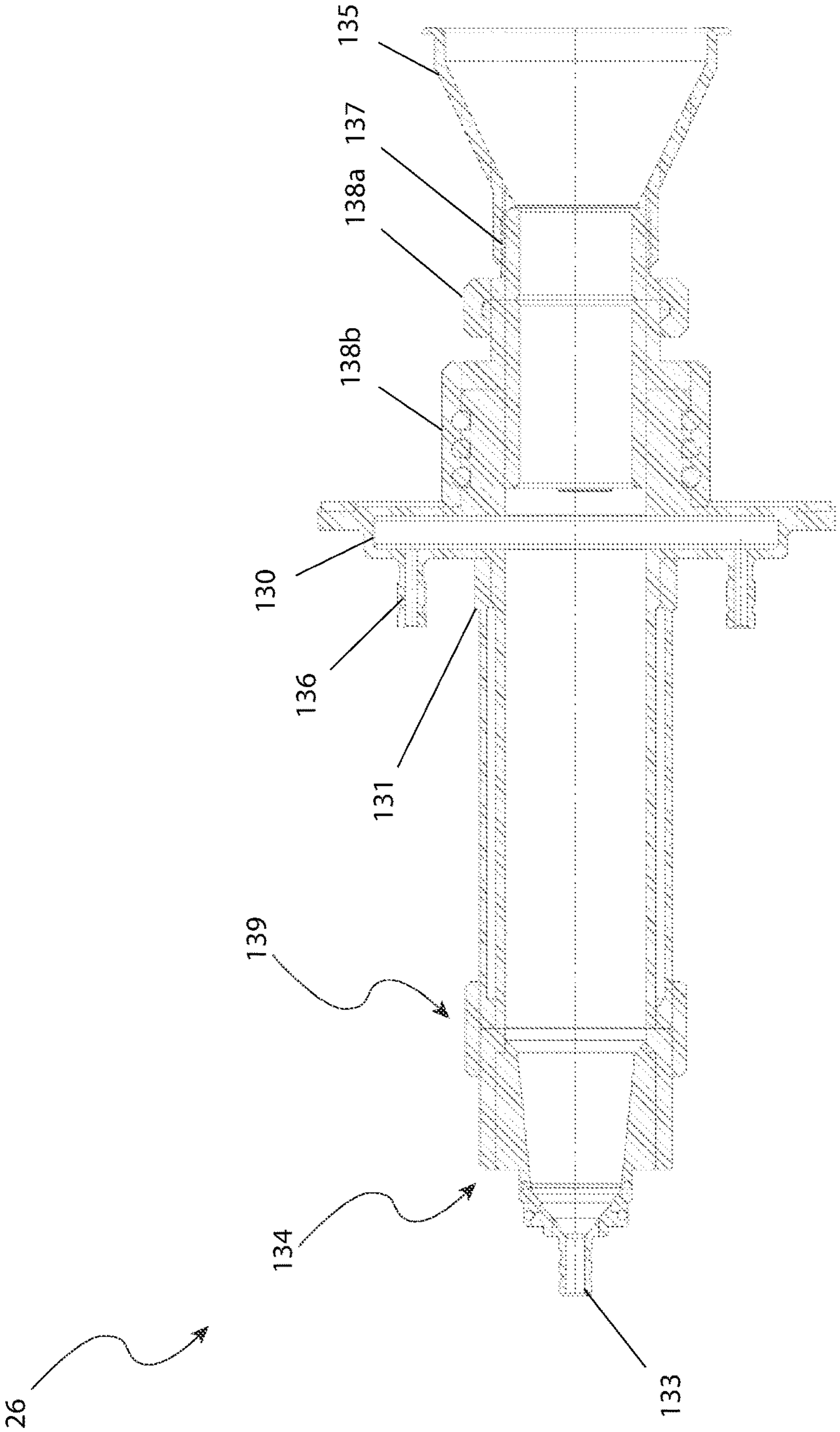
FIG. 6*b* is a cross-sectional view of the plasmatron 26 along the line III-III (see FIG. 4*a*), according to the preferred embodiment of the present device.

Referring now to FIGS. 6*a* and 6*b*, cross-sectional views of the plasmatron 26 along the line, is discussed herein. The design of the plasmatron 26 is preferably pre-fabricated. The basis of the plasmatron is a main chamber 130 where the plasma is generated. The plasma-forming medium is created by a mixture of inert gases, oxygen (O2), and steam. The steam is supplied via the steam inlet 133 which is in fluid communication with the steam delivery line 110 and located most distal from the main chamber 130. The steam delivery line 110 is also in fluid communication with steam generator 80 (see FIG. 10). The steam is accelerated to the required parameters by passing through an expanding channel formed by an inlet bushing array 134 fashioned as conical bushings and sealed with rubber seals. The assembly of the inlet bushing array 134 to the main chamber 130 includes the use of the inlet bushing array fastener 139. Oxygen (O2) is supplied through oxygen (O2) inlet 136 of the main chamber 130. The prepared hot plasma is injected into the reactor interior 29 through a first end of a nozzle 135. The nozzle 135 further comprises an adapter 137 located at a second end which has a nozzle adapter 138*a* capable of removable attachment to an adapter fastener 138*b* located on the main chamber 130 opposite the steam inlet 133, such as through a spherical hinge, assembled using a bayonet connection and sealed in three (3) pieces.

The temperature inside the main chamber 130 may reach greater than fifteen hundred Celsius (1500° C.). The presence of such a high temperature level requires the use of a coolant delivered via the coolant delivery line 60. In this case, ordinary water (H2O) is used as a coolant, which avoids the use of an additional pumping system for a special coolant. The coolant delivery line 60 may be in fluid communication with an external water (H2O) source. The coolant delivery line 60 is also routed to the steam generator 80 (see FIG. 10). Coolant is supplied to the jacket 131 through either one (1) of the two (2) coolant inlets 132.

Figure 11:
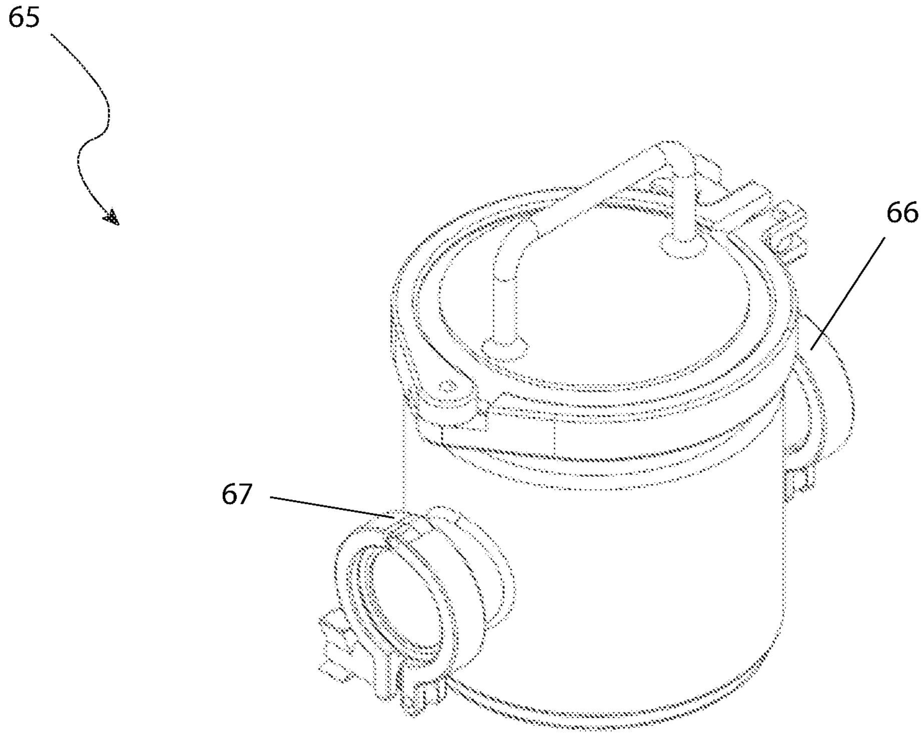
FIG. 11 is a perspective view of a filter 65, according to the preferred embodiment of the present device.

Referring to FIG. 11, the presence of high temperatures in the jacket 131 requires constant cooling by fluid transfer of the coolant through the coolant delivery line 60. In order to avoid equipment failure when the channels of the jacket 131 or coolant delivery line 60 are clogged with water salts, the use of running water (H2O) is discouraged. In this regard the cooling delivery line 60 has an upstream connection in fluid communication with a filter 65 via a filter inlet 66 and a downstream connection in fluid communication with the filter 65 via a filter outlet 67. The filter 65 produces filtered coolant purified from salts.

Figure 10:
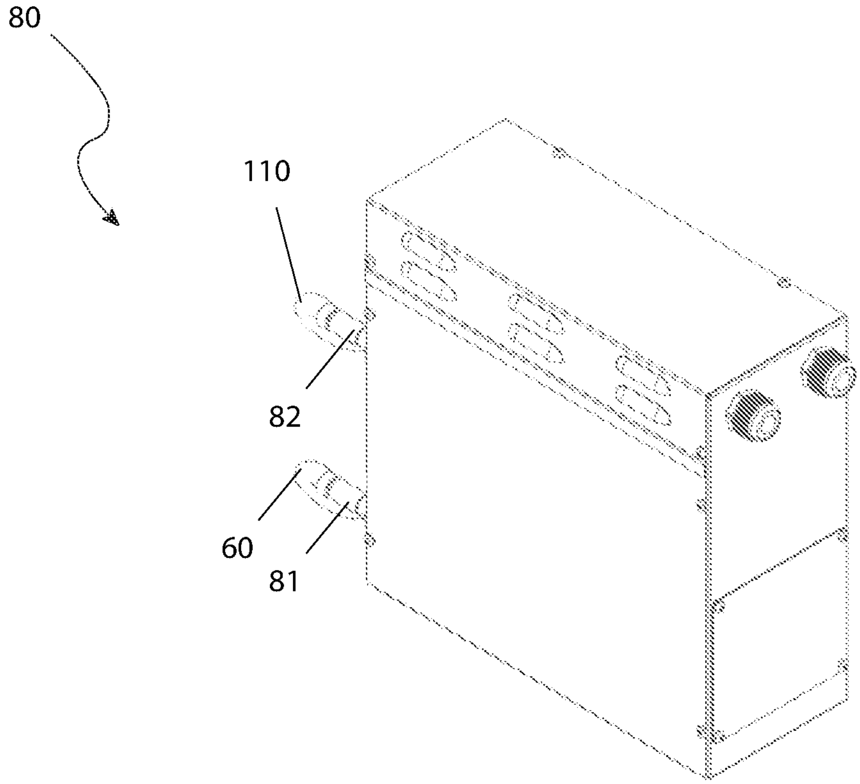
FIG. 10 is a perspective view of a steam generator 80, according to the preferred embodiment of the present device.

Referring now to FIG. 10 there is shown a perspective view of a steam generator 80, which is preferably a universal electric steam generator 80 well known in the art. The steam generator 80 has a steam generator inlet 81 and a steam generator outlet 82. Coolant is supplied to the steam generator 80 via a portion of the coolant delivery line 60 being in fluid communication with the steam generator inlet 81. The main component of generating plasma with the plasmatron 26 is steam, which is produced from the coolant in the steam generator 80. Steam leaves the steam generator 80 via a portion of the steam delivery line 110 being in fluid communication with the steam generator outlet 82. The steam generator 80 is equipped with a control unit and automation, which ensures the accuracy of the regulation of any set parameters.

Figure 12:
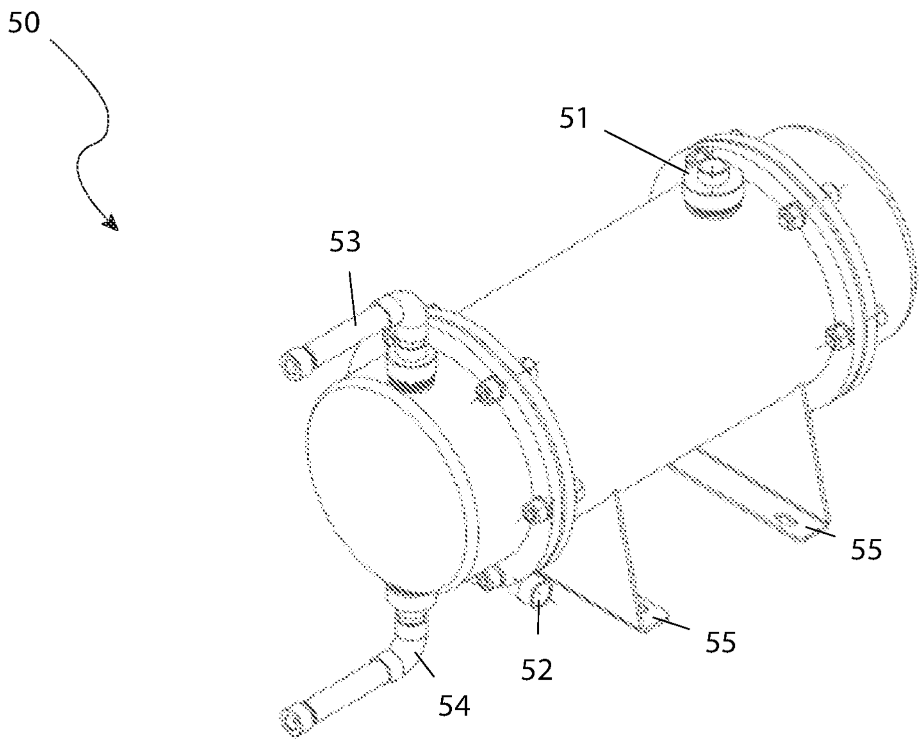
FIG. 12 is a perspective view of a heat exchanger 50, according to the preferred embodiment of the present device.

Referring now to FIG. 12 a heat exchanger 50, is illustrated herein, providing a means to cool coolant in the coolant delivery line 61 downstream from the jacket 131. The heat exchanger 50 is preferably a horizontal cylindrical tubular heat exchanger main chamber, a heat exchanger first end and a heat exchanger second end. The central bottom portion of the heat exchanger main chamber has at least one (1) heat exchanger support 55 located thereon for supporting and securing the heat exchanger 50 to the housing 11. Hot coolant enters the heat exchanger chamber via a branch of the coolant delivery line 60 in fluid communication with the hot side inlet 51 on the heat exchanger first end. Auxiliary coolant is supplied to the heat exchanger chamber via a branch of an auxiliary coolant line (not shown) in fluid communication with cold side inlet 53 on the heat exchanger second end. Heat transfer is delivered to the auxiliary coolant from the coolant, which is now cooled. The cooled coolant exits the heat exchanger via a branch of the coolant delivery line 60 in fluid communication with the hot side outlet 52 on the heat exchanger second end. Warmed auxiliary coolant exits the heat exchanger chamber via a branch of an auxiliary coolant line (not shown) in fluid communication with cold side outlet 54, also on the heat exchanger second end. The warm auxiliary coolant can be stored or directly used as necessary or desired.

Figure 13:
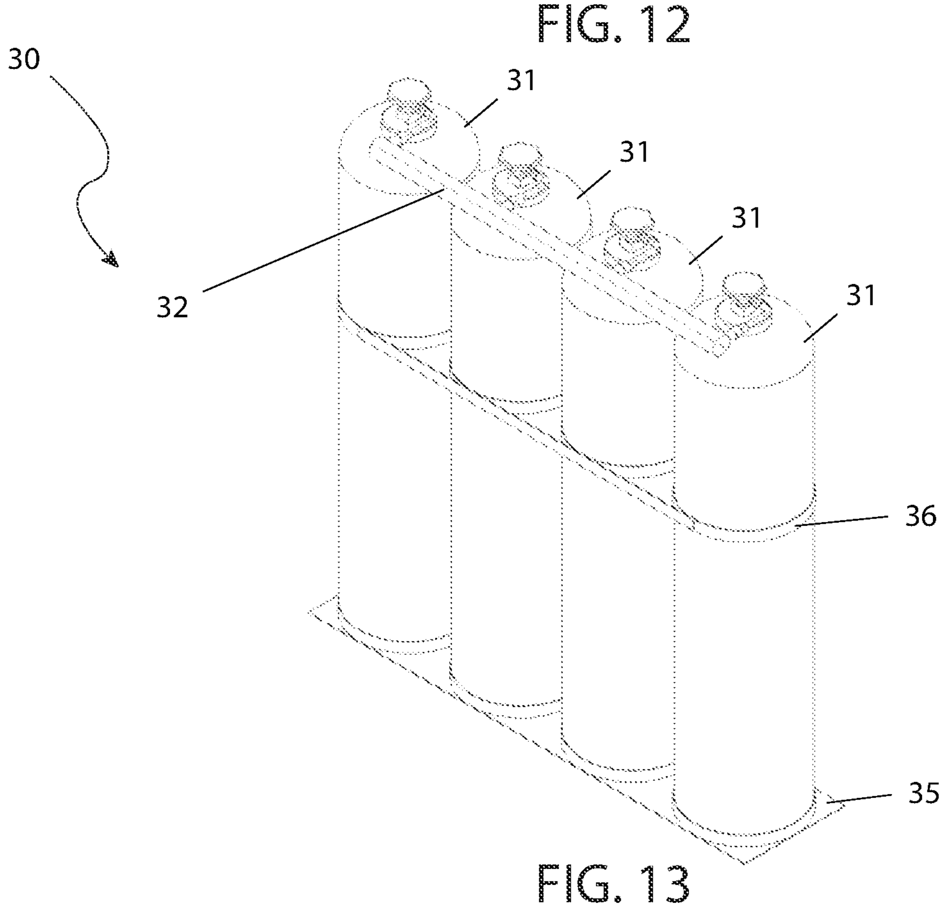
FIG. 13 is a perspective view of an oxygen (O2) system 30, according to the preferred embodiment of the present device.

Now referring to FIG. 13 an oxygen (O2) system 30, preferably comprising a bundle of standard oxygen (O2) cylinders 31, typically provided as bundled in the amount of four (4) cylinders 31. Such a bundle can be accomplished by horizontally stacking the cylinders 31 adjacent to each other in linear fashion on a base 35. A strap 36 can be adjustably fit around all of the cylinders 31 and secured thereto, such that the bundle can be transported as a unitary unit. This will provide a total amount of approximately one hundred liters (100 L) oxygen (O2) with a working pressure of ten megapascals (10 MPa). Each cylinder 31 is in fluid communication with a manifold 32 via valves. Uniform oxygen (O2) production with fully open valves is ensured by the presence of the manifold 32, which is in fluid communication with the oxygen (O2) delivery line 100. In the absence of the possibility of cylinders 31, it is possible to replace the entire bundle as is necessary.

Figure 14B:
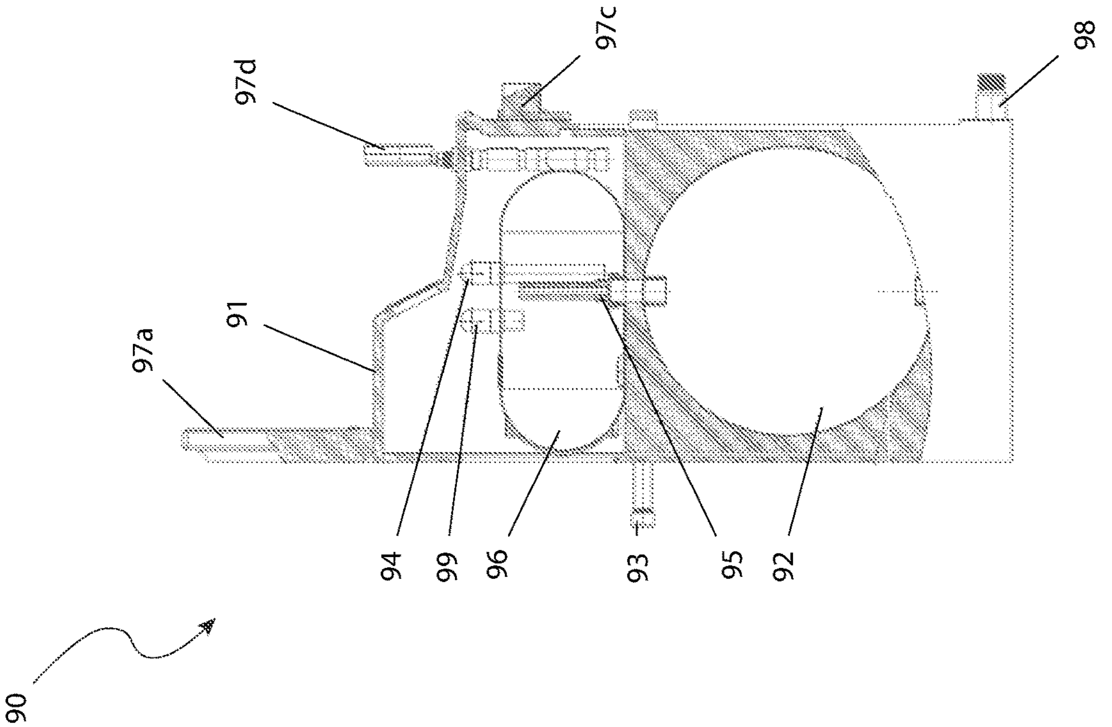
FIG. 14*a* is a cross-sectional view of a syn-gas cleaning system 90, according to the preferred embodiment of the present device; and, FIG. 14*b* is a cross-sectional view of the syn-gas cleaning system 90 along the line V-V (see FIG. 14*a*), according to the preferred embodiment of the present device.
Figure 14A:
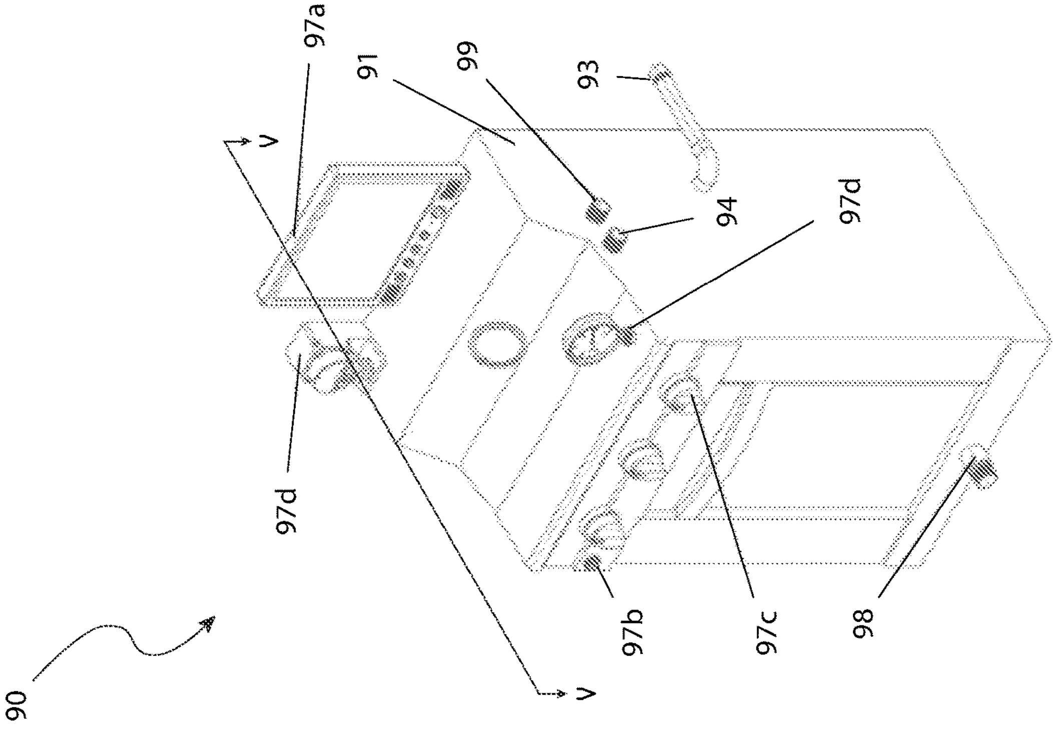

Referring now to FIGS. 14*a* and 14*b* cross-sectional views of the syn-gas cleaning system 90 which is designed for cleaning and storage of the syn-gas, is herein described. The main element of the syn-gas cleaning system is a syn-gas cleaner housing 91 which contains a syn-gas purification tank 96 for collecting and storing pre-purified syn-gas delivered thereto, and a syn-gas tank 92 for collecting and storing purified syn-gas delivered thereto. The syn-gas cleaner housing 91 generally rests on the floor of the housing 11. A syn-gas inlet 94 of the syn-gas purification tank 96 is in fluid communication with the syn-gas delivery line 120. A syn-gas purification tank 96 is filled with water (H2O), which is used for syn-gas purification. The filling of the syn-gas purification tank 96 is accomplished with the use of the water (H2O) inlet 99 of the syn-gas purification tank 96 being in fluid communication with a water (H2O) source. The capacity of the syn-gas purification tank 96 reflects the ability to enable purification of all the syn-gas in full capacity of the syn-gas tank 92 (with an internal pressure of no more than ten atmospheres (10 atm)). During the deaeration process, the syn-gas is purified from impurities accumulating in the upper part of the syn-gas purification tank 96. Purified syn-gas is transferred from the syn-gas purification tank 96 into the syn-gas tank 92 via a syn-gas transfer 95, which is in fluid communication between the syn-gas purification tank 96 and the syn-gas tank 92. A drain 93 is located on the syn-gas cleaner housing 91 and is configured to provide selective removal of any waste water (H2O) generated by the syn-gas cleaning system 90. A purified syn-gas outlet 98 is in fluid communication with the syn-gas purification tank 96 and is capable of transferring purified syn-gas therethrough to an external location.

The monitoring, indicating, and control of the pressure inside the syn-gas tank 92 is accomplished via interaction with the monitor 97*a*, indicator 97*b*, switch 97*c*, and gauge 97*d*, all located on an external and front-facing portion of the syn-gas cleaner housing 91 and in operable control with the syn-gas cleaning system 90. Such a front-facing portion of the syn-gas cleaner housing 91 refers to a position that is preferably facing the front door 12 or any other position that enables unencumbered interaction therewith. The gauge 97*d* particularly monitors syn-gas tank 92 main pressure and temperature. The indicator 97*b* may indicate any parameter meeting or exceeding a pre-determined threshold, or to merely indicate power is provided to the syn-gas cleaning system 90. Mechanical adjustment of the syn-gas cleaning system 90 is carried out on the switch 97*c* based upon a pre-determined operating procedure as monitored by the indicator 97*b* and gauge 97*d* and viewed on the monitor 97*a*.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A plasma waste treatment plant comprising:

a reactor for thermal decomposition of waste with incomplete oxidation under an influence of water vapor (H2O), atmospheric oxygen (O2), and pressure, wherein pyrolysis starts at temperatures above one thousand Celsius (1000° C.);

at least one plasmatron located on the reactor for generating plasma by mixing inert gases, oxygen (O2), and steam;

an oxygen (O2) system for supplying oxygen (O2) to the plasmatron;

a steam generator for producing steam from a coolant;

a drive motor system comprising an agitator for mixing waste inside the reactor;

a heat exchanger for cooling the coolant downstream from the reactor;

a syn-gas cleaning system for purifying the syn-gas formed at an outlet of the reactor;

a coolant delivery line for supplying coolant to the reactor, steam generator, and the heat exchanger;

a syn-gas delivery line for conveying the syn-gas produced in the reactor to the syn-gas cleaning system; and, a compact housing containing all components of the plant; and, wherein the syn-gas formed at the outlet of the reactor comprises a mixture of hydrogen (H2), carbon monoxide (CO), and other combustible gases;

wherein the syn-gas obtained after purification can be utilized as a raw material for a production of methanol (CH3OH), higher alcohols, ammonia (NH4), nitrogenated fertilizers, synthetic motor oil, and fuel;

wherein the syn-gas obtained after purification can be used for autonomous power supply of a small room or for powering a portion or an entirety of an operation of the plant; and, wherein the plasma waste treatment plant exist in a portable configuration.

2. The plant according to claim 1, wherein a process of steam-plasma processing is not affected by a humidity of a processed waste and does not lose its destructive ability when a moisture content of a solid changes.

3. The plant according to claim 2, wherein no liquid, solid, or gaseous emissions are released into an environment during the operation of the plant.

4. The plant according to claim 3, wherein the plant operates silently and does not emit odors.

5. The plant according to claim 1, wherein no chemicals are added during the operation of the plant, and any processing of biologically contaminated waste is completely sterilized under an influence of high temperatures greater than thirty-five hundred degrees Celsius (>3500° C.) and high levels of ultraviolet radiation produced within the plant.

6. The plant according to claim 1, wherein the plant is universal and permits disposal of both solid and wet waste.

7. The plant according to claim 1, wherein the reactor has a six-sided rectangular prismatic reactor body with rounded corners and insulation on its inner surface, and it is preferably manufactured out of metal.

8. The plant according to claim 7, wherein the reactor has a capacity of five to ten kilowatts (5-10 kW) and includes at least three plasmatrons arranged along a common bisecting annular line on the surface of the reactor body.

9. The plant according to claim 1, wherein the agitator is indirectly driven by a prime mover of the drive motor system, and the agitator includes a helical screw portion capable of agitating and mixing waste inside the reactor.

10. The plant according to claim 1, wherein each plasmatron is removably attached to a reactor body with a plasmatron mount and is capable of generating plasma by mixing inert gases, oxygen ($O_2$), and steam.

11. The plant according to claim 10, wherein the plasmatron mount is a bushing of having a first end and an opposing second end comprising a bore, configured to affix the plasmatron to the reactor body.

12. The plant according to claim 11, wherein each plasmatron comprises a main chamber where the plasma is generated, and a plasma-forming medium is created by a mixture of inert gases, oxygen ($O_2$), and steam.

13. The plant according to claim 1, further comprising the steam generator for producing steam from the coolant and in fluid communication with a steam delivery line.

14. The plant according to claim 1, further comprising the heat exchanger for cooling the coolant downstream from the reactor and the heat exchanger is in fluid communication with the coolant delivery line.

15. The plant according to claim 1, further comprising the oxygen ($O_2$) system comprising a bundle of standard oxygen ($O_2$) cylinders in fluid communication with the oxygen ($O_2$) delivery line for supplying oxygen ($O_2$) to the plasmatron.

16. The plant according to claim 1, further comprising the syn-gas cleaning system comprising a syn-gas cleaner housing, a syn-gas purification tank, and a syn-gas tank for collecting and storing purified syn-gas.

17. The plant according to claim 16, wherein the syn-gas purification tank is filled with water ($H_2O$) for syn-gas purification, and purified syn-gas is transferred from the syn-gas purification tank to the syn-gas tank via a syn-gas transfer.

* * * * *